(12) United States Patent
Dubuc et al.

(10) Patent No.: US 7,787,458 B2
(45) Date of Patent: Aug. 31, 2010

(54) METHOD AND APPARATUS FOR COMMUNICATING DATA PACKETS ACCORDING TO CLASSES OF SERVICE

(75) Inventors: Ken Dubuc, Ottawa (CA); Jason T. Sterne, Ottawa (CA); Thomas E. Davis, Ottawa (CA); Nutan Behki, Nepean (CA)

(73) Assignee: Alcatel-Lucent Canada Inc., Kanata, ON (CA)

( * ) Notice: Subject to any disclaimer, the term of this patent is extended or adjusted under 35 U.S.C. 154(b) by 2499 days.

(21) Appl. No.: 09/998,504

(22) Filed: Nov. 30, 2001

(65) Prior Publication Data

US 2003/0103503 A1 Jun. 5, 2003

(51) Int. Cl.
*H04L 12/28* (2006.01)
*H04L 12/56* (2006.01)
(52) U.S. Cl. .................................. 370/392; 370/395.21
(58) Field of Classification Search .................. 370/229, 370/230, 231, 235, 252, 253, 395.2, 395.21, 370/395.42, 395.43
See application file for complete search history.

(56) References Cited

U.S. PATENT DOCUMENTS

| | | | | |
|---|---|---|---|---|
| 5,889,762 | A * | 3/1999 | Pajuvirta et al. | 370/230 |
| 6,175,570 | B1 * | 1/2001 | Cukier et al. | 370/414 |
| 6,473,434 | B1 * | 10/2002 | Araya et al. | 370/412 |
| 6,584,122 | B1 * | 6/2003 | Matthews et al. | 370/493 |
| 6,621,793 | B2 * | 9/2003 | Widegren et al. | 370/230.1 |
| 6,671,277 | B1 * | 12/2003 | Sugai et al. | 370/395.21 |
| 6,775,231 | B1 * | 8/2004 | Baker et al. | 370/230.1 |
| 6,778,535 | B1 * | 8/2004 | Ash et al. | 370/395.21 |
| 6,940,862 | B2 * | 9/2005 | Goudreau | 370/395.52 |
| 7,072,300 | B1 * | 7/2006 | Chow et al. | 370/236 |
| 7,227,842 | B1 * | 6/2007 | Ji et al. | 370/235 |
| 2002/0021668 | A1 * | 2/2002 | Yorinaga et al. | 370/233 |
| 2002/0181044 | A1 * | 12/2002 | Kuykendall, Jr. | 359/124 |
| 2003/0058880 | A1 * | 3/2003 | Sarkinen et al. | 370/413 |
| 2003/0081624 | A1 * | 5/2003 | Aggarwal et al. | 370/412 |

OTHER PUBLICATIONS

RFC 2474, Definition of the Differentiated Services Field (DS Field) in the IPv4 and IPv6 Headers, Dec. 1998.*
RFC 2475, Architecture for Differentiated Services, Dec. 1998.*

* cited by examiner

*Primary Examiner*—Ayaz R Sheikh
*Assistant Examiner*—Blanche Wong
(74) *Attorney, Agent, or Firm*—Ross D. Snyder & Associates, Inc.

(57) ABSTRACT

A method and apparatus for communicating data packets according to classes of service is described. One or more service interfaces are coupled to a plurality of transport interfaces. The service interfaces carry packets having multiple classes of service, while each of the plurality of transport interfaces carries packets of a single class of service. A differentiated services codepoint profile is associated with each service interface and maps a differentiated services codepoint value of a data packet to a class of service and a drop precedence. The data packet is assigned to a transport interface based on its class of service and its drop precedence. Other factors, such as the destination of the data packet may be considered when assigning the data packet to a transport interface. Data packets from different transport interfaces are preferably enqueued in different queues of a destination service interface.

7 Claims, 8 Drawing Sheets

METHOD AND APPARATUS FOR COMMUNICATING DATA PACKETS ACCORDING TO CLASSES OF SERVICE

TECHNICAL FIELD OF THE INVENTION

The invention relates generally to data communications and telecommunications and more specifically to communicating packets of information according to classes of service.

BACKGROUND OF THE INVENTION

Communication networks are used to communicate information between various locations. While an ideal communication network would be able to instantly communicate an arbitrarily large amounts of information among arbitrarily diverse locations, such a communication network is not practical. Rather, actual communication networks are limited in both throughput (the amount of information that may be communicated) and latency (the time it takes to communicate the information).

While it is possible to treat all types of information similarly, such treatment is generally not ideal. Rather, the significance of various network performance parameters varies among different types of information. For example, some types of information, such as teleconferencing information, may have high bandwidth requirements and require almost instantaneous communication. However, such information may not be substantially degraded if not all of the information is effectively communicated. In other words, small portions of the information may be dropped occasionally without great adverse effects.

Other types of information, such as realtime interactive communication of information having lower bandwidth and delay constraints, may be subject to a requirement that all of the information be accurately communicated. For example, a point-of-sale terminal may not communicate a large amount of information, but the information it communicates may be required to be communicated in a timely manner with no loss of information.

Still other types of information may have even more relaxed delay requirements. For example, a file transfer application may communicate large amounts of data, but may allow several hours for the data to be transmitted. Thus, because of the different properties of different types of information, it is useful to be able to provide service discrimination in the communication of the information. By allowing service discrimination based on the types of information, various parameters of the communication networks may be optimized with respect to each type of information so as to maximize the overall effectiveness of the communication of the information as a whole.

In order to facilitate such service discrimination, various communications protocols provide various features and enhancements. For example, the Internet protocol (IP) provides "differentiated services" enhancements to enable scalable service discrimination in the Internet and other IP-based networks.

Differentiated services are described in S. Blake et al., "An Architecture for Differentiated Services," Request for Comments 2475, The Internet Society, December 1998, hereafter RFC2475, and K. Nichols et al., "Definition of the Differentiated Services Field (DS Field) in the IPv4 and IPv6 Headers," Request for Comments 2474, The Internet Society, December 1998, hereafter referred to as RFC2474. Both RFC2475 and RFC2474 are incorporated herein by reference.

In a network of IP nodes, a unicast packet which travels from its source node to its destination node may traverse several intermediate routing nodes. The interfaces between nodes have a fixed amount of bandwidth, buffer storage, or other resources, for which all packets using that interface, possibly from multiple sources to multiple destinations, must contend.

While the differentiated services enhancements described in RFCs 2475 and 2474 provide some desirable characteristics, they are not ideal. They suffer from various shortcomings. For example, the introduction of a differentiated services codepoint field requires that a differentiated services codepoint value be examined throughout the network and that the information be handled throughout the network in a manner consistent with the differentiated services codepoint value. This constant examination of the differentiated services codepoint value requires additional processing capability within the network and effectively reduces the bandwidth of the network. Moreover, the introduction of the differentiated services codepoint field opens up the possibility that a user could modify the differentiated services codepoint value to perpetrate theft-of-service and denial-of-service attacks within the network.

Another problem arising from the existing differentiated services enhancements is the requirement that the entire network be upgraded to be compatible with the differentiated services enhancements. Communication of information according to the differentiated services enhancements may be impaired if a node does not support such enhancements.

Thus, a technique is needed to allow communication of information in a manner that allows service discrimination while avoiding the disadvantages of existing differentiated services approaches.

DETAILED DESCRIPTION OF A PREFERRED EMBODIMENT

Figure 1:
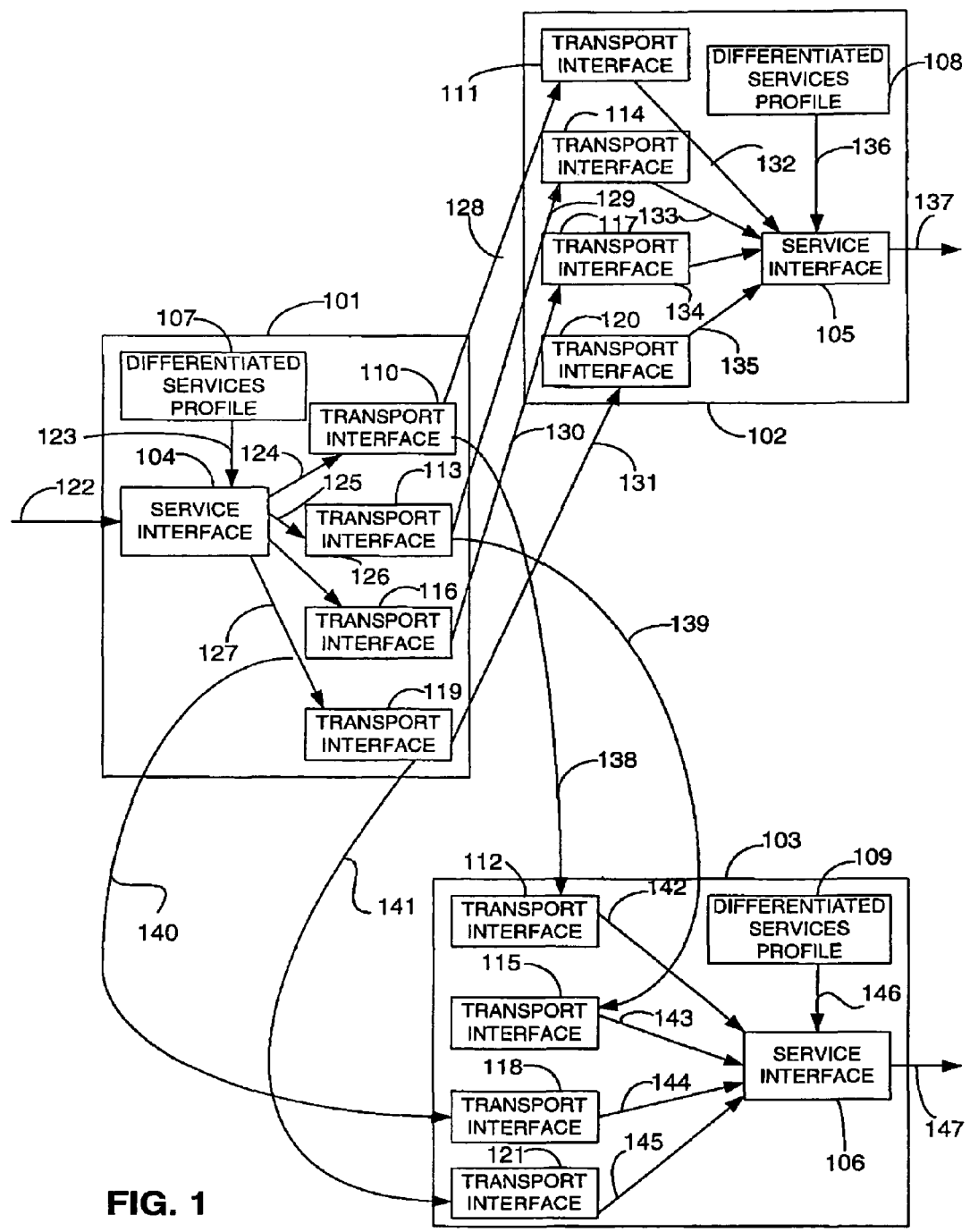
FIG. 1 is a block diagram illustrating an apparatus for communicating data packets according to classes of service in accordance with an embodiment of the present invention.

A method and apparatus for communicating data packets according to classes of service is described. One or more service interfaces are coupled to a plurality of transport interfaces. The service interfaces carry packets having multiple classes of service, while each of the plurality of transport interfaces carries packets of a single class of service. A differentiated services codepoint profile is associated with each service interface and maps a differentiated services codepoint value of a data packet to a class of service and a drop precedence. The data packet is assigned to a transport interface based on its class of service. Other factors, such as the destination of the data packet may be considered when assigning the data packet to a transport interface. Data packets from different transport interfaces are preferably enqueued in different queues of a destination service interface.

It is often desirable that different packets receive different "classes of service." That is, at points in a network where multiple packets are contending for some resources, the network element may accord different packets different treatment. Each packet can be classified such that it is associated with exactly one "class of service" (CoS). A particular "class of service" may be parameterized such that the aggregate of packets having that CoS receive some specified bandwidth, latency, priority, delay variation or other externally observable characteristic.

One mechanism by which an upstream node (which may be the packet's source node, or which may be an upstream router) can communicate to its downstream router the class of service which a particular packet should receive is by use of the "differentiated services codepoint" (DSCP) field in the Internet protocol version 4 (Ipv4) or Internet protocol version 6 (Ipv6) packet header. The description of this field is elaborated in RFC2474. Essentially, the 6-bit DSCP is used to select a "per-hop behavior" (PHB), where a per-hop behavior is "a description of the externally observable forwarding treatment applied at a differentiated-services compliant node to a . . . collection of packets with the same codepoint crossing a link in a particular direction." The PHB selected for a packet is descriptive of the CoS and drop precedence received by that packet.

As referred to herein, an "interface" represents a distinguishable entity over which IP packets can be transmitted and/or received between nodes of an IP network. Interfaces encompass both physical interfaces and logical interfaces. Examples of logical interfaces include ATM virtual channels (VCs), frame relay datalink logical channels (DLCs), and TI timeslots. (The term "interface" as used herein is synonymous with the term "link" used in RFC2475 and related work.)

When any routing node receives a packet over an interface, it will determine the interface over which that packet should be retransmitted such that it gets closer to its destination. The determination of the outgoing interface is based on information in the packet's header, the interface on which the packet was received, and/or other criteria or constraints.

All nodes have some mechanism for queuing packets which are to be transmitted over a particular interface. Such queues represent finite storage resources, so such a queuing mechanism includes a mechanism by which packets can be discarded when storage resource consumption has reached some exhaustion threshold.

Nodes embodying the present invention are provided with an additional mechanism to have the packets queued for particular interface be transmitted (or discarded) in order other that strict first-in-first-out (FIFO). Without the limiting or specifying the methods for implementing such a mechanism, such a mechanism can in general be modeled in terms of having multiple queues of packets to be transmitted on a particular interface, where packets in any single queue are never reordered with respect to other packets on the same queue, but the order in which one of the multiple queues are selected for delivery of a packet to an interface for transmission is determined by other criteria. As illustrative examples, each of the multiple queues may be serviced such that some queues are exhaustively serviced over others, such that each queue gets a "weighted fair share" of the interface's bandwidth, such that packets on a certain queue are transmitted within some time of having been enqueued, and so on.

Furthermore, such queues may provide mechanisms allowing for the discarding of certain packets once queue storage space and/or packet ages reach certain limits. A packet's "drop precedence" (DP) determines the packet's likelihood of being discarded from a particular queue at a certain queue storage consumption level, relative to other packets in that queue with a different DP. As described in RFC2474, an interface's queue service or queue management mechanisms are the means through which PHBs are implemented.

An embodiment of the present invention provides "service interfaces" and "transport interfaces." A "service interface" (SI) is an interface carrying IP packets whose DSCPs represent a mixture of CoSs. A "transport interface" (TI) is an interface carrying packets whose CoS is uniform.

In a node embodying one embodiment of the present invention, in the data path between a packet's incoming interface and its outgoing interface, there will be exactly one queue if the outgoing interface is a TI. In this data path, there may be one queue per CoS if the outgoing interface is an SI; alternately, packets with different CoSs may share the same queue. Data paths from different incoming interfaces to the same outgoing interface (whether SI or TI) may or may not share queues.

An embodiment of the invention may be applied to a network of routing nodes under a common administration. The interfaces at the boundary of this network are SIs—that is, interfaces at the boundary of this network will be carrying packets with a mixture of CoSs.

Interfaces between nodes within this network are TIs. Between any two nodes within this network will be at least one bundle of TIs. According to one embodiment of the invention, a bundle of TIs will contain exactly one TI for each CoS used to transport packets between nodes. For the purposes of routing, a bundle of TIs is considered to be a single routing interface. That is, a node's routing computation that determines the interface over which a received packet should be retransmitted can select of bundle of TIs as the outgoing interface. The selection of the particular TI within the bundle as the outgoing interface is also facilitated by the invention, as described below. In one embodiment of the invention, the number of CoSs on a node embodying this invention is on the order of $10^1$ to $10^2$.

In accordance with an embodiment of the invention, "DSCP profiles" are provided. A "DSCP profile" is a data structure mapping from each of the 64 possible DSCP values to a class of service and a drop precedence. A particular node embodying this invention has one or more DSCP profiles. In a particular DSCP profile, there may be one or more CoSs or DPs available on the node which do not appear in a mapping from any DSCP value. The mappings from DSCP values to CoSs and DPs for the set of DSCP profiles may be configured administratively. In one embodiment of the invention, the number of DSCP profiles on a node embodying this invention is on the order of $10^1$ to $10^2$.

In accordance with one embodiment of the invention, each SI is associated with exactly one DSCP profile. This association may configured administratively. Different SIs may be associated with different DSCP profiles.

When a packet is received over an SI, a node embodying this invention will retrieve the DSCP profile associated with that SI. From the retrieved DSCP profile and the DSCP value in the packet, the node will determine the CoS and DP which the packet is to receive.

The present invention may be implemented such that a packet's DSCP value and the DSCP profile used may be a factor in, but not be the sole determinant of, the packet's CoS and DP. (For example, if the packet was part of a flow that was being policed by the node, then the policer may also affect the packet's DP. As another example, if the packet is being received over a frame relay DLC or ATM VC, then the frame relay DE or ATM CLP may affect the packet's DP.)

When a packet is received over a TI, a node embodying the invention will attribute to the packet the CoS which is associated with the TI. Since each TI is preferably associated with exactly one CoS, the contents of the received packet need not be examined to determine the packet's CoS. In fact, the TI need not support differentiated services or multiple CoSs. Thus, the present invention provides backwards compatibility with network elements that do not support these features, thereby avoiding the need to upgrade an entire network to provide service discrimination.

Three strategies can be used to determine the packet's DP, alone or in some combination. First, a DSCP profile can also be associated with a bundle of TIs, and this DSCP profile can be used to compute the packet's DP in the same fashion as is done for packets received on SIs. Second, the node can use information outside the packet's DSCP, such as the output of a policer or the frame relay DE or ATM CLP associated with the packet, to determine the packet's DP. Finally, all packets received on a particular interface can be treated as having the same DP, or, alternatively, for a TI which traverses a switch fabric as opposed to a network, the DP can be encoded in an internal canonical format in a proprietary header. Thus, any received packet will be associated with a CoS and a DP. Each packet may then be queued for retransmission.

If a routing function determines that a packet was to be retransmitted over a bundle of TIs, then the packet's CoS is used to select which TI within that bundle is to be used to retransmit the packet. The packet is then enqueued on the queue associated with the selected TI. The packet's DP, together with the queue's storage level, maybe used to determine whether the packet should be enqueued or discarded. Additionally, the packet's DP may be stored along with the packet on the queue, for use in future discarding decisions. The packet's DP may also be transmitted along with the packet itself in some fashion supported by the outgoing interface (such as frame relay DE, ATM CLP, or DSCP).

If the routing function determined that the packet was to be retransmitted over an SI, then the packet's CoS is used to select which of the SIs queues should be used to enqueue the packet, provided that the node supports multiple queues in the data path between the incoming interface and outgoing SI. The packet's DP, together with the queue's storage level, may be used to determine whether the packet should be enqueued or discarded. Additionally, the packet's DP may be stored along with the packet on the queue, for use in future discarding decisions. The packet's DP may also be transmitted along with the packet itself in some fashion supported by the outgoing interface (such as frame relay DE, ATM CLP, or DSCP).

As an example, an embodiment of the invention may be implemented using ATM interfaces as TIs. Between two nodes in a network embodying the invention will be an ATM interface transporting all TIs, wherein each TI occupies a different ATM VC. Each TI VC can be configured with different service categories, peak and sustainable cell rates, burst sizes, cell delay variations and so on, effectively providing different service to packets transported over those TI VCs. Such an implementation provides two levels of DP, where each packet's DP is mapped to a CLP value in the cells constituting the packet. Alternatively, the invention may be practiced using other types of networking technology.

On a node embodying the invention, where many TIs use similar interfaces, a "CoS profile" may be created for each CoS. A CoS profile allows for the common administration and management of all TIs with that CoS with respect to parameters such as bandwidth, packet queueing delay, packet delay variations, service categories, and so on.

As another example, an embodiment of the invention may be provided within a single node, rather than a network of nodes interconnected by TIs. In such an embodiment, TIs may be interfaces that are purely internal to the node, for example, interfaces that appear only on a node's backplane. As a further embodiment, TIs may not exist as distinct entities at all; instead, the CoS and DP classification performed at the SI that receives the packet is used to select the queue on which the packet is to be stored pending transmission by the packet's outgoing SI.

The small number of DSCP profiles—preferably less than or equal to the number of interfaces—eases the administration of DSCP processing across all interfaces. Because different SIs can have different DSCP profiles, different SIs can be in different differentiated services (DS) domains and access to different CoSs can be controlled. Moreover, such features may be easily administered. Since different SIs can be in different differentiated services (DS) domains, packets arriving on different SIs can use different DSCP mappings to receive common CoSs.

The ability to control access to different CoSs is also beneficial. If a network provider has a policy that packets arriving on certain SIs should have access only to certain CoSs, regardless of the packets' DSCP values, then the DSCP profile associated with those SIs can be set only to the CoSs to which the packet's access correspond.

Because TIs have uniform CoSs, a packet arriving on a TI can have its CoS determined without inspection of the packet contents. This is advantageous as TIs can pass through switching equipment that does not support differentiated services without losing the segregation of packets having different CoSs on different TIs.

The present invention may be beneficially applied to data communications and telecommunications, for example to Internet protocol routing and switching utilizing differentiated services capability.

FIG. 1 is a block diagram illustrating an apparatus for communicating data packets according to classes of service in accordance with an embodiment of the present invention. The apparatus includes a first node 101, and second node 102, and a third node 103. The first node 101 comprises a service interface 104, a differentiated service profile 107, and transport interfaces 110, 113, 116, and 119. Node 102 comprises a service interface 105, a differentiated service profile 108, and transport interfaces 111, 114, 117, and 120. Node 103 includes service interface 106, differentiated service profile 109, and transport interfaces 112, 115, 118, and 121.

Data packets are provided to service interface 104 via input 122. Differentiated service profile 107 is associated with service interface 104 via input 123. The data packets received at service interface 104 include a differentiated service codepoint field having a plurality of differentiated service codepoint values. Transport interfaces 110, 113, 116, and 119 are operatively coupled to service interface 104. Service interface 104 is coupled to transport interface 110 via coupling 124. Service interface 104 is coupled to transport interface 113 via coupling 125. Service interface 104 is coupled to transport interface 116 via coupling 126. Service interface 104 is coupled to transport interface 119 via coupling 127. When a first data packet having a first differentiated service codepoint value is received at service interface 104, service interface 104 assigns the first data packet 104 to one of the transport interfaces 110, 113, 116, or 119 according to the differentiated service profile 107.

Differentiated service profile 107 maps differentiated service codepoint values to classes of services and drop precedence. Thus, the assignment of data packets according to classes of service can occur by determining a class of service associated with a differentiated service codepoint value of a data packet and assigning the data packet to a transport interface accordingly. With a second data packet having a second differentiated service codepoint value is provided to service interface 104, service interface 104 assigns the second data packet to a second transport interface of transport interfaces 110, 113, 116, or 119 according to the differentiated service profile 107.

Node 101 is coupled to node 102 and node 103. Specifically, transport interface 110 of node 101 is coupled to transport interface 111 of node 102 via coupling 128 and to transport interface 112 of node 103 via coupling 138. Transport interface 113 of node 101 is coupled to transport interface 114 of node 102 via coupling 129 and to transport interface 115 of node 103 via node 139. Transport interface 116 of node 101 is coupled to transport interface 117 of node 102 via coupling 130 and to transport interface 118 of node 103 via coupling 140. Transport interface 119 of node 101 is coupled to transport interface 120 of node 102 via coupling 131 and to transport interface 121 of node 103 via coupling 141.

Within node 102, service interface 105 receives data packets from transport interfaces 111, 114, 117, and 120. Data packets from transport interface 111 are provided to service interface 105 via input 132. Data packets from transport interface 114 are provided to service interface 105 via input 133. Data packets from transport interface 117 are provided to service interface 105 via input 134. Data packets from transport interface 120 are provided to service interface 105 via input 135. Differentiated service profile 108 is associated with service interface 105 via input 136. Service interface 105 forwards data packets over output 137 in accordance with differentiated service profile 108. Service interface 105 obtains an inverse mapping from differentiated service profile 108 based on a class of service and/or drop precedence to determine a differentiated service codepoint value for a packet. Service interface 105 preferably writes the differentiated service codepoint value into a header, for example, an IPv4 header, of the packet.

In node 103, data packets carried by transport interface 112 are provided to service interface 106 via input 142. Data packets carried over transport interface 115 are provided to service interface 106 via input 143. Data packets carried over transport interface 118 are provided to service interface 106 via input 144. Data packets carried over transport interface 121 are provided to service interface 106 via input 145. Differentiated service profile 109 is associated with service interface 106 via input 146. Service interface 106 routes packets over output 147 according to differentiated service profile 109. Service interface 106 obtains an inverse mapping from differentiated service profile 109 based on a class of service and/or drop precedence to determine a differentiated service codepoint value for a packet. Service interface 106 preferably writes the differentiated service codepoint value into a header, for example, an IPv4 header, of the packet.

Figure 2:
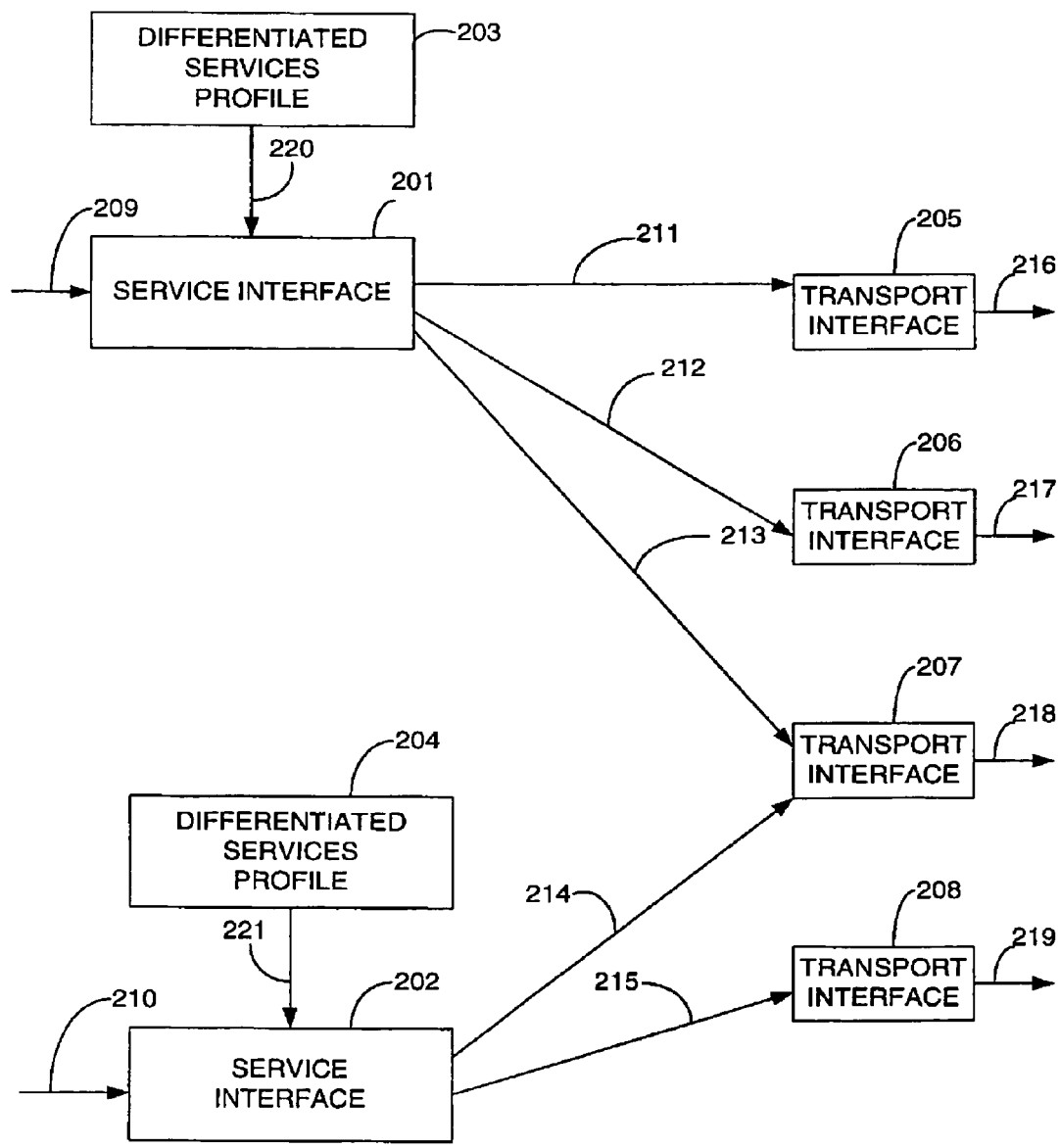
FIG. 2 is a block diagram illustrating an apparatus for communicating data packets according to classes of service in accordance with an embodiment of the present invention.

FIG. 2 is a block diagram illustrating an apparatus for communicating data packets according to classes of service in accordance with an embodiment of the present invention. Data packets are received at service interface 201 from input 209. The data packets include a differentiated service codepoint field having a plurality of differentiated service codepoint values. Differentiated service profile 203 is associated with service interface 201 via input 220. Transport interfaces 205, 206, and 207 are operatively coupled to service interface 201. Service interface 201 is coupled to transport interface 205 via coupling 211. Service interface 201 is coupled to transport interface 206 via coupling 212. Service interface 201 is coupled to transport interface 207 via coupling 213. Differentiated service profile 203 maps differentiated service codepoint values to classes of services and drop precedences. Each of transport interfaces 205, 206, and 207 is associated with a particular class of service and drop precedence. Thus, data packets are routed to transport interfaces 205, 206, and 207 according to classes of service of the data packets and the mappings provided by differentiated service profile 203. From transport interface 205, data packets are provided to output 216. From transport interface 206, data packets are provided to output 217. From transport interface 207, data packets are provided to output 218.

For example, when a first data packet having a first differentiated service codepoint value is received at service interface 201, a first class of service and a first drop precedence for the first data packet are determined based on the first differentiated service codepoint value of the first data packet using the mapping provided by the differentiated service profile 203. The first data packet is assigned to a first transport interface of transport interfaces 205, 206, and 207 according to the first class of service and the first drop precedence as determined based on the differentiated service profile 203. The first transport interface then carries the first data packet from the service interface to another service interface.

Likewise, when a second data packet having a second differentiated service codepoint value is received at service interface 201, a second class of service and a second drop precedence for the second data packet are determined based on the second differentiated service codepoint value using the mapping provided by the differentiated service profile 203. The second data packet is assigned to a second transport interface of transport interfaces 205, 206, and 207 according to the second class of service and the second drop precedence as determined based on the differentiated service profile 203. The second transport interface then carries the second data packet from the service interface to another service interface.

Service interface 202 is operatively coupled to transport interface 207 and to transport interface 208. Service interface 202 is coupled to transport interface 207 via coupling 214. Service interface 202 is coupled to transport interface 208 via coupling 215. Data packets are provided to service interface 202 via input 210. Differentiated service profile 204 is associated with service interface 202 via input 221. When service interface 202 receives a data packet having a differentiated service codepoint value in its differentiated service codepoint field, the service interface 202 assigns the data packet to a transport interface according a class of service and drop precedence as determined by the differentiated service codepoint value of the data packet using the mapping provided by the differentiated service profile 204.

When a data packet is assigned to a transport interface, that transport interface then carries the data packet, for example, to another service interface. In this example, transport interface 207 provides data packets to output 218, and transport interface 208 provides data packets to output 219.

As can be seen from FIG. 2, transport interface 207 is operatively coupled to both service interface 201 and service interface 202. Transport interface 207 carries data packets from service interface 201 and service interface 202 having the same class of service and drop precedence. In accordance with another aspect of the invention, transport interfaces may be grouped in bundles, with each bundle carrying data packets to a particular node. For example, transport interfaces 205, 206, 207, and 208 may be grouped as one bundle carrying data packets to one node, while other transport interfaces may be grouped as other bundles carrying data packets to other nodes. In such a configuration, transport interface 207 would carry data packets having the same class of service, the same drop precedence, and the same destination.

Figure 3:
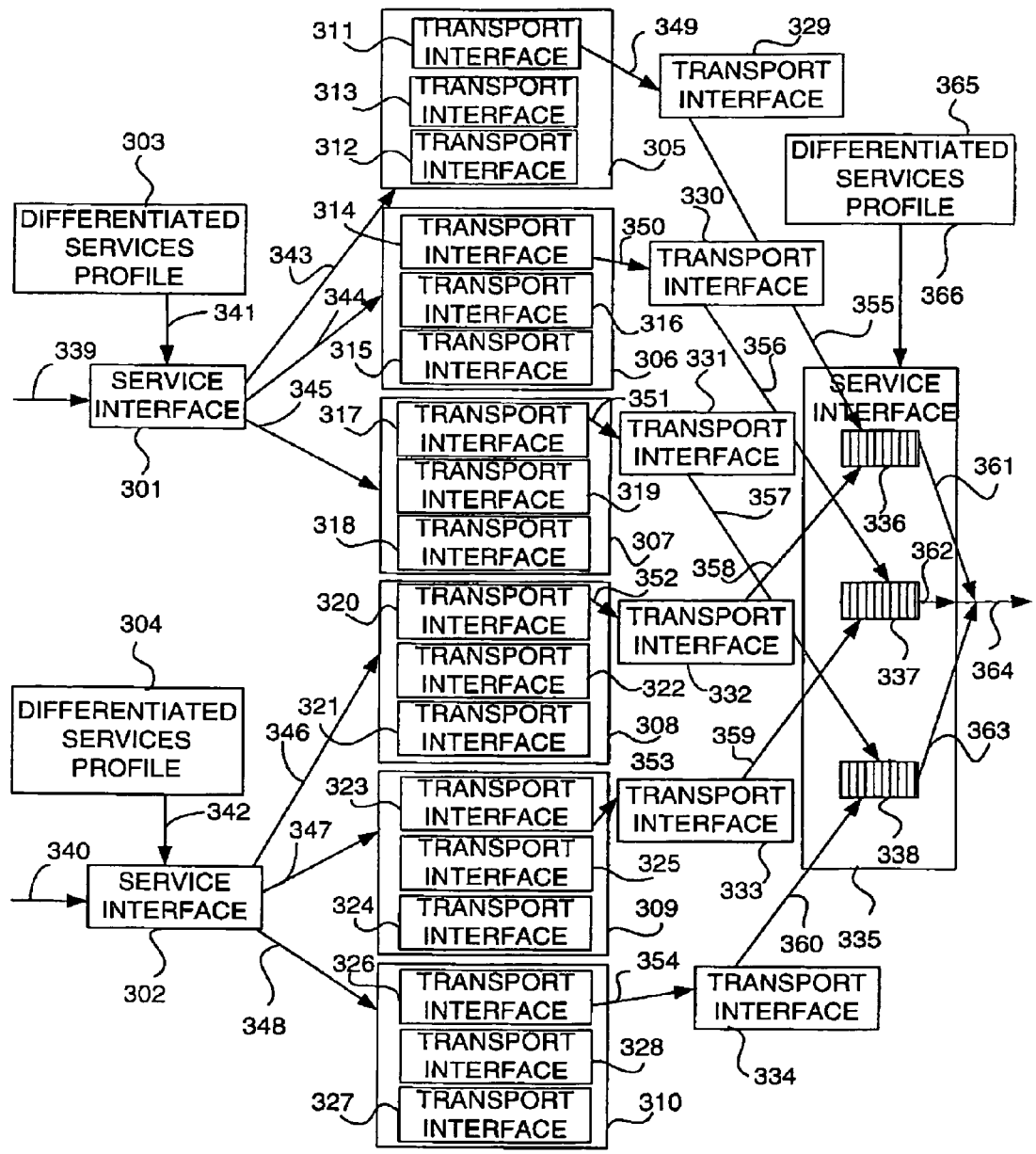
FIG. 3 is a block diagram illustrating an apparatus for communicating data packets according to classes of service in accordance with an embodiment of the present invention.

FIG. 3 is a block diagram illustrating an apparatus for communicating data packets according to classes of service in accordance with an embodiment of the invention. The apparatus includes service interface 301, differentiated service profile 303, service interface 302, differentiated service profile 304, bundle 305 of transport interfaces 311, 312, and 313, bundle 306 of transport interfaces 314, 315, and 316, bundle 307 of transport interfaces 317, 318, and 319, bundle 308 of transport interfaces 320, 321, and 322, bundle 309 of transport interfaces 323, 324, and 325, bundle 310 of transport interfaces 326, 327, and 328. The apparatus also includes transport interfaces 329, 330, 331, 332, 333, and 334, differentiated service profile 365, and service interface 335. Service interface 335 includes queues 336, 337, and 338.

Data packets are received at service interface 301 via input 339. Differentiated service profile 303 is associated with service interface 301 via input 341, allowing service interface 301 to obtain a differentiated service codepoint value mapping from differentiated service profile 303 via input 341. Data packets are routed to bundles 305, 306, and 307 of transport interface via couplings 343, 344, and 345, respectively. Data packets are assigned to particular bundles according to their destinations. For example, data packets at service interface 301 destined for queue 336 of service interface 335 are assigned to bundle 305, while data packets destined for queue 337 of service interface 335 are assigned to bundle 306.

Within each bundle, data packets are assigned to transport interfaces in accordance with their classes of service as determined according to mappings provided by differentiated service profile 303 based on a differentiated service codepoint value in a differentiated service codepoint field of a data packet. For example, for a certain differentiated service codepoint value, a data packet is assigned to transport interface 311 of bundle 305. Transport interface 311 carries the data packet. From transport interface 311, the data packet is forwarded to transport interface 329, which may be the same transport interface as transport interface 311 or may be a different transport interface, via coupling 349. From transport interface 329, the data packet is forwarded to queue 336 of service interface 335 via coupling 355. Service interface 335 can obtain an inverse mapping from differentiated service profile 365 via input 366. From queue 336, the data packet is provided at output 364 via coupling 361. If the data packet had a different differentiated service codepoint value, but the same destination, it might be assigned to transport interface 312 or transport interface 313.

As another example, for a certain differentiated service codepoint value, a data packet is assigned to transport interface 314 of bundle 306. Transport interface 314 carries the data packet. From transport interface 314, the data packet is forwarded to transport interface 330, which may be the same transport interface as transport interface 314 or may be a different transport interface, via coupling 350. From transport interface 330, the data packet is forwarded to queue 337 of service interface 335 via coupling 356. Service interface 335 can obtain an inverse mapping from differentiated service profile 365 via input 366. From queue 337, the data packet is provided at output 364 via coupling 362. If the data packet had a different differentiated service codepoint value, but the same destination, it might be assigned to transport interface 315 or transport interface 316.

As yet another example, for a certain differentiated service codepoint value, a data packet is assigned to transport interface 317 of bundle 307. Transport interface 317 carries the data packet. From transport interface 317, the data packet is forwarded to transport interface 331, which may be the same transport interface as transport interface 317 or may be a different transport interface, via coupling 351. From transport interface 331, the data packet is forwarded to queue 338 of service interface 335 via coupling 357. Service interface 335 can obtain an inverse mapping from differentiated service profile 365 via input 366. From queue 338, the data packet is provided at output 364 via coupling 363. If the data packet had a different differentiated service codepoint value, but the same destination, it might be assigned to transport interface 318 or transport interface 319.

Data packets destined for service interface 335 may also originate from service interface 302. Data packets are provided to service interface 302 via input 340. Differentiated service profile 304 is associated with service interface 302 via input 342, allowing service interface 302 to obtain a differentiated service codepoint value mapping from differentiated service profile 304 via input 342. Differentiated service profile 304 maps differentiated service codepoint values found in differentiated service codepoint fields of the data packets to classes of service and drop precedences. Data packets are assigned to transport interfaces according to their classes of service and drop precedences based on the mappings of their differentiated service codepoint values provided by differentiated service profile 304.

The transport interface are grouped in bundles 308, 309, and 310 based on the destinations associated with the transport interfaces. Preferably, each bundle contains exactly one transport interface for each class of service, although other bundle configurations may be used.

As an example, for a certain differentiated service codepoint value, a data packet from service interface 302 destined for queue 336 of service interface 335 is assigned to transport interface 320 of bundle 308. Transport interface 320 carries the data packet. From transport interface 320, the data packet is forwarded to transport interface 332, which may be the same transport interface as transport interface 320 or may be a different transport interface, via coupling 352. From transport interface 332, the data packet is forwarded to queue 336 of service interface 335 via coupling 358. From queue 336, the data packet is provided at output 364 via coupling 361. If the data packet had a different differentiated service codepoint value, it might be assigned to transport interface 321 or transport interface 322.

As another example, for a certain differentiated service codepoint value, a data packet from service interface 302 destined for queue 337 of service interface 335 is assigned to transport interface 323 of bundle 309. Transport interface 323 carries the data packet. From transport interface 323, the data packet is forwarded to transport interface 333, which may be the same transport interface as transport interface 323 or may be a different transport interface, via coupling 353. From transport interface 333, the data packet is forwarded to queue 337 of service interface 335 via coupling 359. From queue 337, the data packet is provided at output 364 via coupling 362. If the data packet had a different differentiated service codepoint value, it might be assigned to transport interface 324 or transport interface 325.

As yet another example, for a certain differentiated service codepoint value, a data packet from service interface 302 destined for queue 338 of service interface 335 is assigned to transport interface 326 of bundle 310. Transport interface 326 carries the data packet. From transport interface 326, the data packet is forwarded to transport interface 334, which may be the same transport interface as transport interface 326 or may be a different transport interface, via coupling 354. From transport interface 334, the data packet is forwarded to queue 338 of service interface 335 via coupling 360. From queue 338, the data packet is provided at output 364 via coupling 363. If the data packet had a different differentiated service codepoint value, it might be assigned to transport interface 327 or transport interface 328.

Figure 4:
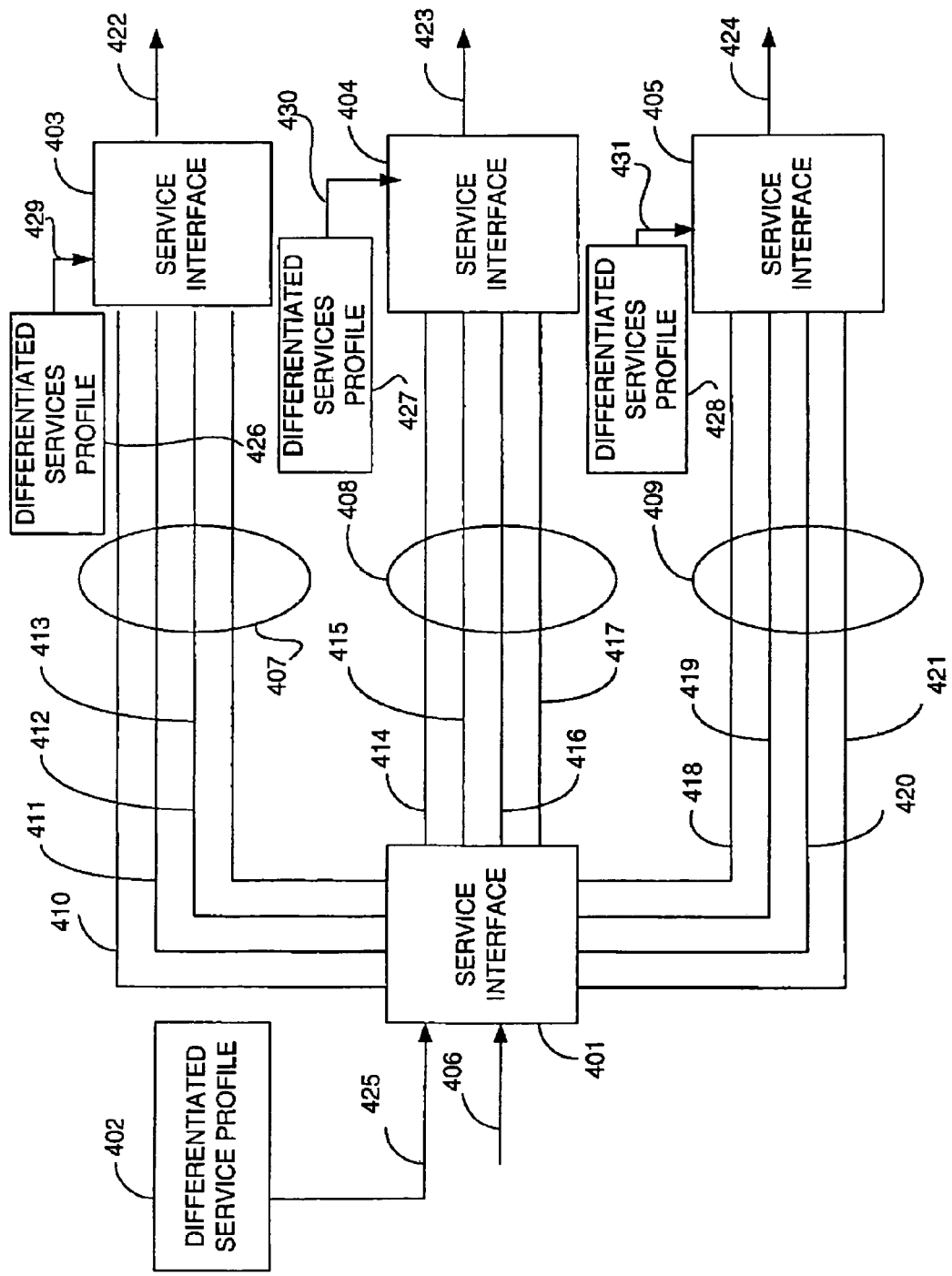
FIG. 4 is a block diagram illustrating an apparatus for communicating data packets according to classes of service in accordance with an embodiment of the present invention.

FIG. 4 is a block diagram illustrating an apparatus for communicating data packets according to classes of service in accordance with an embodiment of the present invention. Data Packets are received at service interface 401 via input 406. Differentiated service profile 402 is associated with service interface 401 via input 425, allowing service interface 401 to obtain a differentiated service codepoint value mapping from differentiated service profile 402. Service interface 401 is coupled to service interface 403 via a bundle 407 of transport interfaces 410, 411, 412, and 413. Differentiated service profile 426 is associated with service interface 403 via input 429, allowing service interface 403 to obtain an inverse mapping from differentiated service profile 426. Service interface 403 provides an output 422.

Service interface 401 is coupled to service interface 404 via bundle 408 of transport interfaces 414, 415, 416, and 417. Differentiated service profile 427 is associated with service interface 404 via input 430, allowing service interface 404 to obtain an inverse mapping from differentiated service profile 427. Service interface 404 provides output 423.

Service interface 401 is coupled to service interface 405 via bundle 409 of transport interfaces 418, 419, 420, and 421. Differentiated service profile 428 is associated with service interface 405 via input 431, allowing service interface 405 to obtain an inverse mapping from differentiated service profile 428. Service interface 405 provides output 424.

Service interface 401 carries data packets. The data packets may have multiple classes of service. The data packets have a differentiated service codepoint field that contains a differentiated service codepoint value. Transport interfaces 410 through 421 are operably coupled to service interface 401. Transport interfaces 410 through 413 carry subsets of the data packets wherein the classes of service of the subset data packets are unique to each of transport interfaces 410 through 413.

Differentiated service profile 402 defines a correspondence of differentiated service codepoint values contained in the differentiated service codepoint fields of the data packets to the classes of service that correspond to the data packets. Differentiated service profile 402 may further define a correspondence of the differentiated service codepoint values to the classes of service and to drop precedences. When routing a data packet, service interface 401 uses differentiated service profile 402 to determine a class of service of the data packet based on a differentiated service codepoint value of the data packet.

Data packets may be routed to different destinations according to bundles 407, 408, and 409. For example, data packets destined for service interface 403 may be routed via bundle 407. Likewise, data packets destined for service interface 404 may be routed via bundle 408, and, data packets destined for service interface 405 may be routed via bundle 409. Service interface 401 applies a routing function to select an appropriate bundle of transport interfaces through which a data packet should be routed. In addition to selecting a bundle of transport interfaces over which a data packet should be routed, service interface 401 may select a specific transport interface within the bundle to carry a data packet based on the class of service of the data packet.

Figure 5:
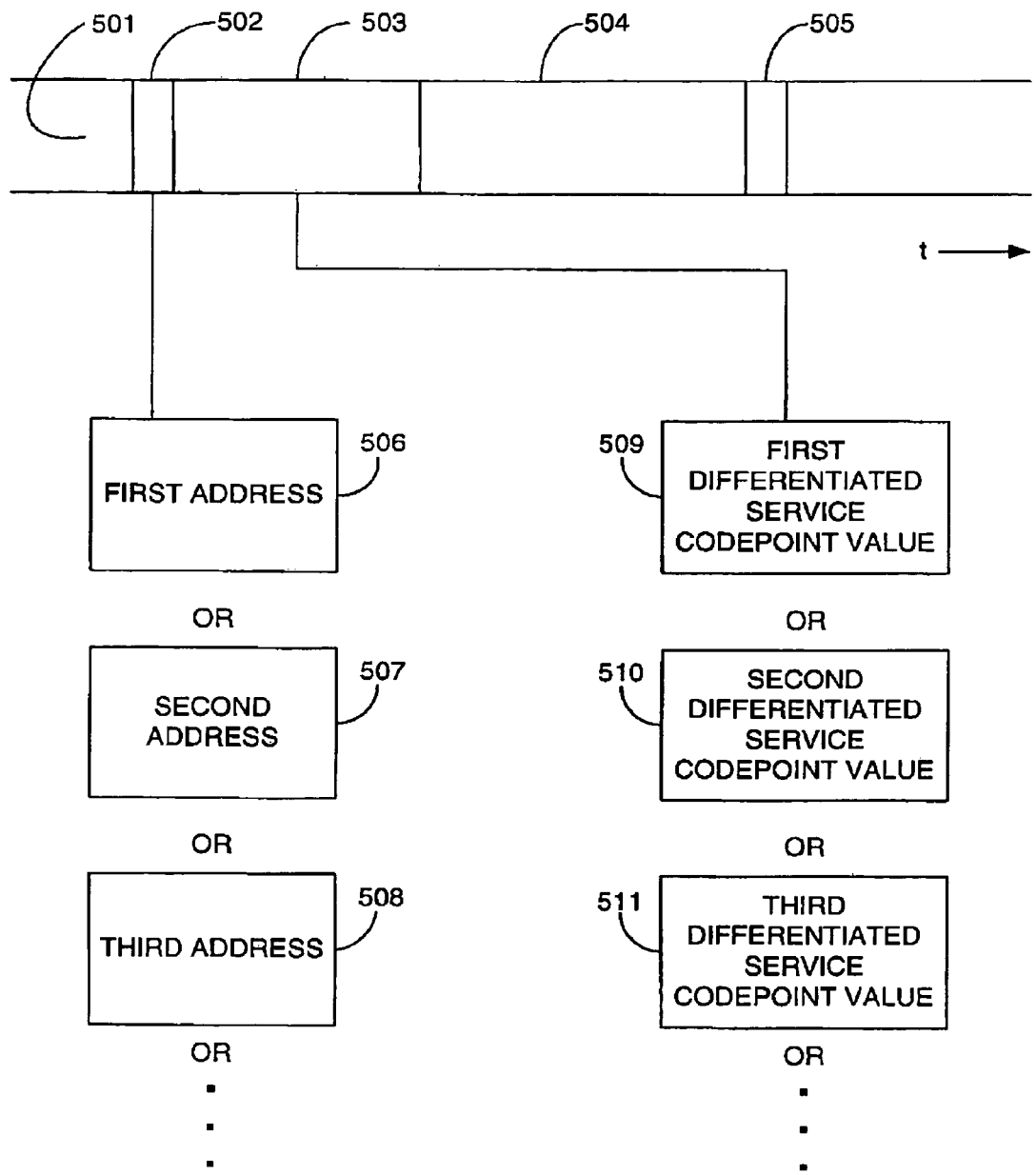
FIG. 5 is a diagram illustrating a data packet to be carried according to an embodiment of the present invention.

FIG. 5 is a diagram illustrating a data packet to be carried according to an embodiment of the present invention. Data packet 501 includes a header 502, a differentiated service codepoint field 503, a body 504, and a check sum field 505. Header 502 includes information, such as an address identifying a destination of the data packet. Examples of such an address are first address 506, second address 507, and third address 508. Other information useful for routing the data packet may also be contained in header 502. Differentiated service codepoint field 503 contains a differentiated service codepoint value. For example, differentiated service codepoint field 503 may contain first differentiated service codepoint value 509, second differentiated service codepoint value 510, or third differentiated service codepoint value 511. Body 504 of data packet 501 includes the payload data intended to be transmitted in data packet 501. Check sum field 505 may include a check sum value and/or any other information to conclude the data packet and verify its successful transmission.

Figure 6:
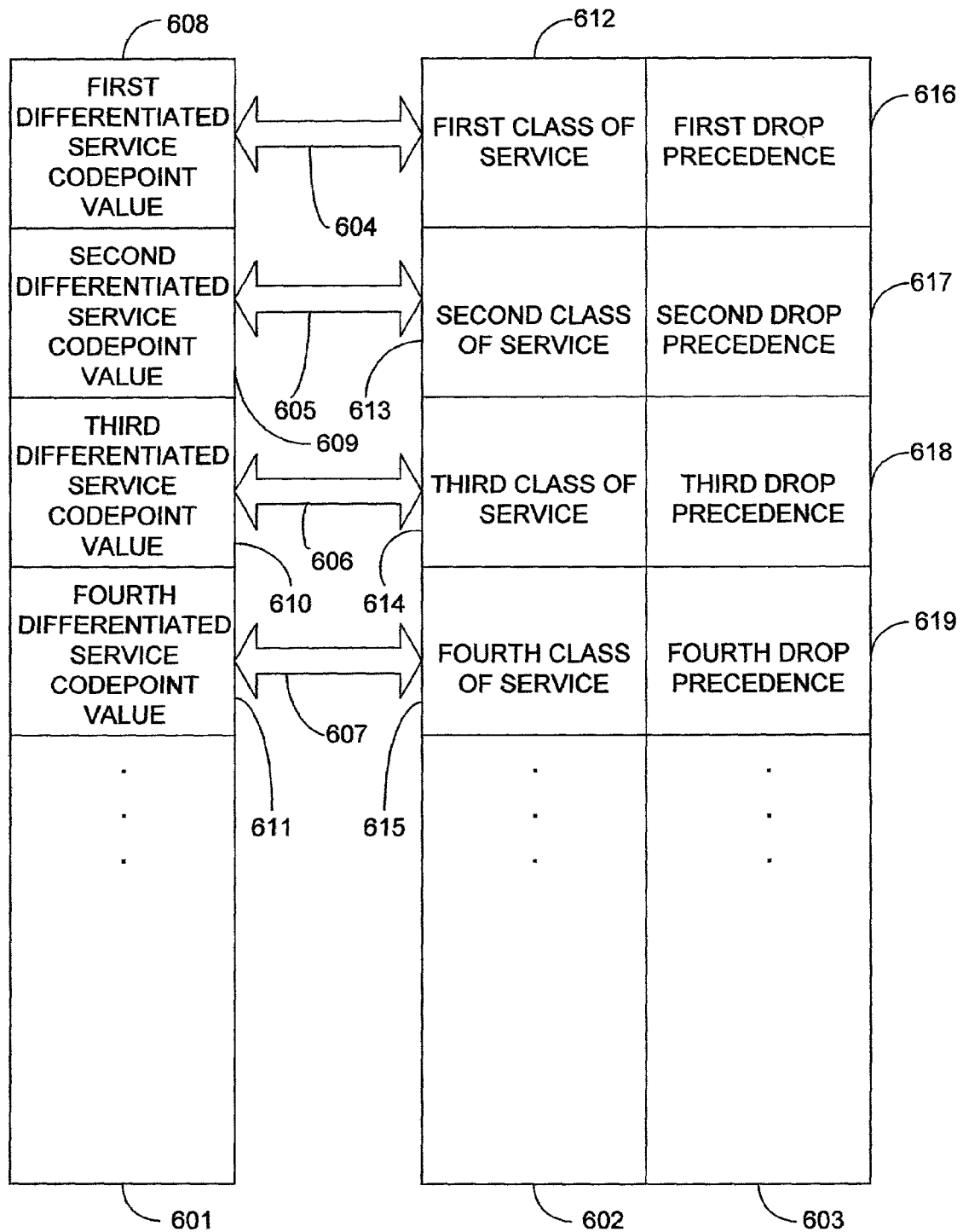
FIG. 6 illustrates an example of a mapping of differentiated service codepoint values to classes of service and drop precedences using a differentiated service profile according to an embodiment of the present invention.

FIG. 6 illustrates an example of a mapping of differentiated service codepoint values to classes of service and drop precedences using a differentiated service profile according to an embodiment of the present invention. A differentiated service profile maps differentiated service codepoint values 601 to classes of service 602 and drop precedences 603. For example, mapping 604 of the differentiated service profile maps first differentiated service codepoint value 608 to first class of service 612 and first drop precedence 616. As another example, mapping 605 of the differentiated service profile maps a second differentiated service codepoint value 609 to a second class of service 613 and a second drop precedence 617. As yet another example, mapping 606 of the differentiated service profile maps third differentiated service codepoint value 610 to third class of service 614 and third drop precedence 618. As yet a further example, mapping 607 of the differentiated service profile maps fourth differentiated service codepoint value 611 to fourth class of service 615 and fourth drop precedence 619. As indicated by the ellipses in FIG. 6, the mapping of differentiated service codepoint values to classes of service and drop precedences using a differentiated service profile is not limited to the examples mentioned above. Any number of mappings may be provided relating any number of differentiated service codepoint values to any number of classes of service and any number of drop precedences. Also, as indicated by the double-headed arrows illustrating mappings 604-607, a mapping may be used as a differentiated service codepoint mapping or as an inverse mapping.

Figure 7:
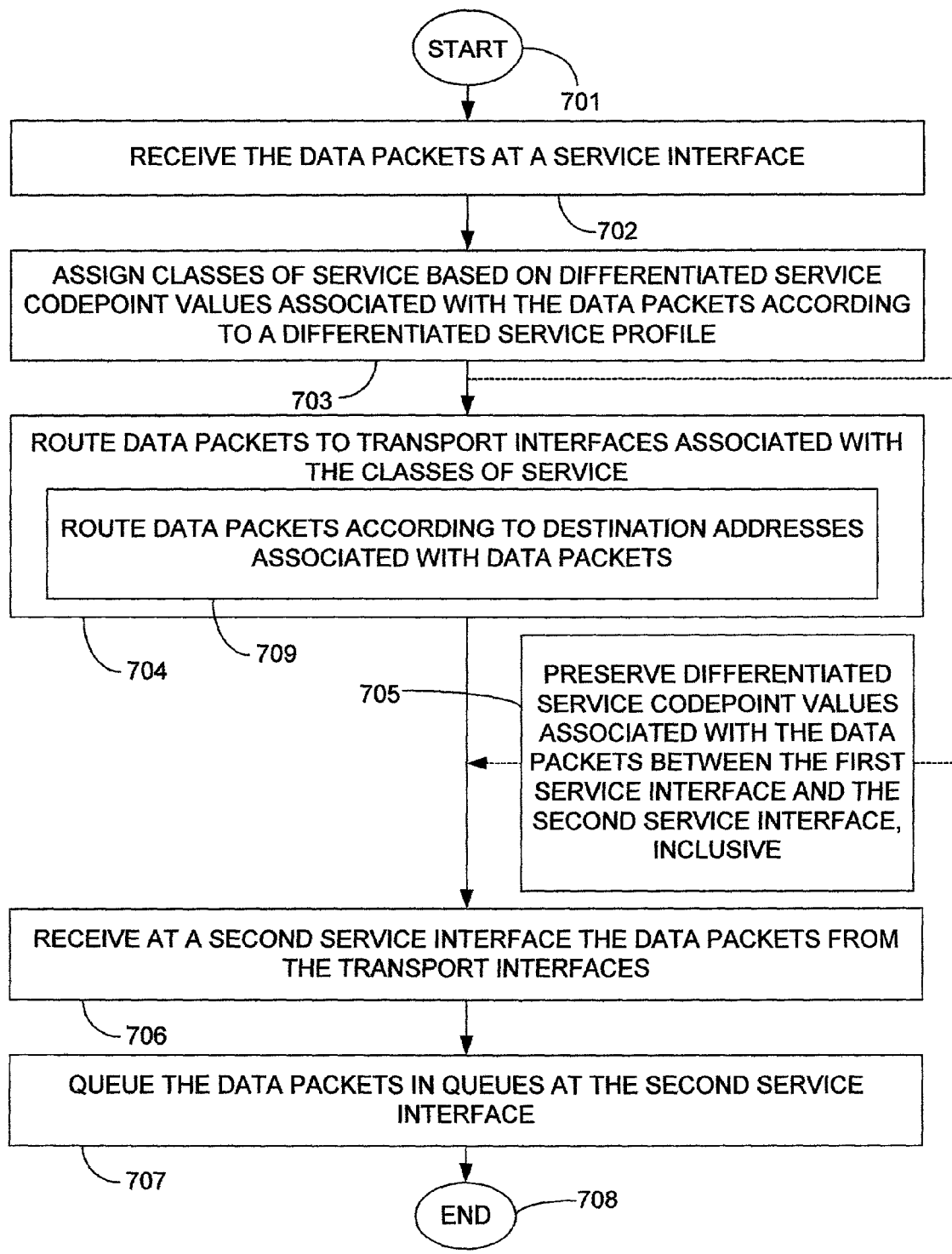
FIG. 7 is a flow diagram illustrating a method in accordance with an embodiment of the present invention.

FIG. 7 is a flow diagram illustrating a method in accordance with an embodiment of the present invention. The method begins in step 701. In step 702, data packets are received at a service interface. In step 703, classes of service and/or drop precedences are assigned to the data packets based on differentiated service codepoint values associated with the data packets according to a differentiated service profile. For example, the differentiated service profile preferably provides a mapping of differentiated service codepoint values to classes of service and/or drop precedences. In step 704, data packets are routed to transport interfaces associated with the classes of service and/or drop precedences. Thus, by maintaining an awareness of such associations, information pertaining to the classes of service and/or drop precedences can be effectively transmitted along the transport interfaces, for example, between service interfaces. Step 704 may also include step 709. In step 709, data packets are routed according to destination addresses associated with the data packets. While data packets are being routed along transport interfaces between a first service interface and a second service interface in step 704, step 705 is also performed. In step 705, differentiated service codepoint values associated with the data packets are preserved as the data packets are carried between the first service interface and the second service interface, inclusive.

From steps 704 and 705, the process continues to step 706. In step 706, a second service interface receives the data packets from the transport interfaces. In step 707, the data packets are queued in the queues at the second service interface. In one embodiment, each of the queues is associated with a corresponding transport interface. Optionally, queues are selected according to the classes of service of the data packets. For example, the process may include a step of communicating the classes of service as information within the data packets. That step may occur, for example, as part of step 704, in lieu of step 704, or after step 704.

Step 707 may include a step of determining new differentiated service codepoint values based on the classes of service upon receipt of the data packets at the second service interface. Step 707 may include a step of applying new differentiated service codepoint values to the data packets, for example, by inserting the differentiated service codepoint values into headers, such as IPv4 headers or IPv6 headers of the packets. The differentiated service codepoint values may be obtained from a differentiated service profile associated with the second service interface. If, optionally, a differentiated service codepoint value is not applied to a packet at the second service interface, an original differentiated service codepoint value originally associated with that packet may be maintained, since the original differentiated service codepoint value may be conveyed along with the packet through a transport interface, for example, via an IPv4 header or IPv6 header of the packet. The method ends in step 708.

Figure 8:
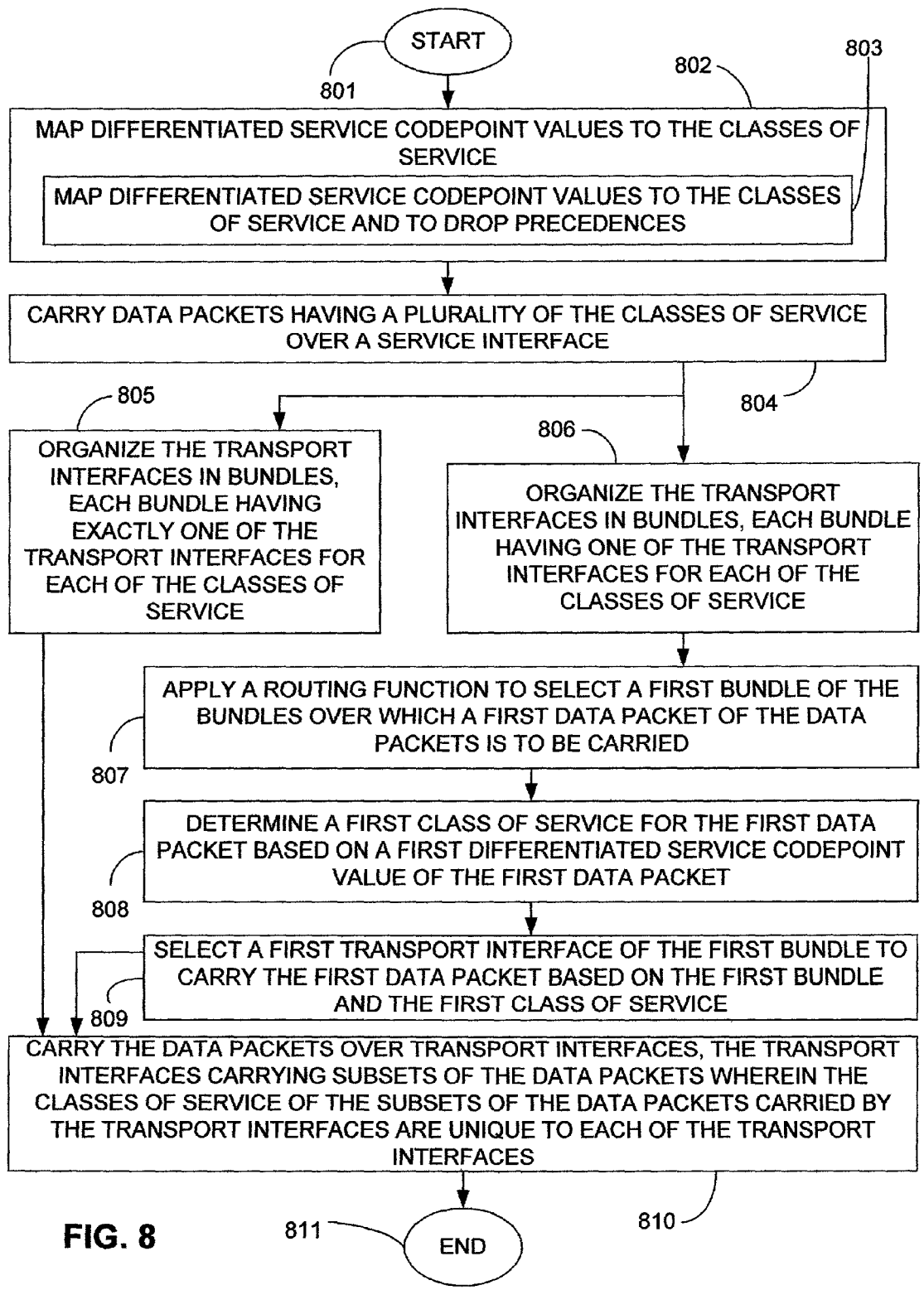
FIG. 8 is flow diagram illustrating a method in accordance with an embodiment of the present invention.

FIG. 8 is flow diagram illustrating a method in accordance with an embodiment of the present invention. The method begins in step 801. In step 802, differentiated service codepoint service values are mapped to classes of service. Step 802 may include step 803. In step 803, differentiated service codepoint values are mapped to the classes of service and to drop precedences. From 802, the method continues to step 804. In step 804, data packets having a plurality of classes of service are carried over a service interface. From step 804, the method may continue to either of steps 805 or 806. In step 805, the transport interfaces are organized in bundles. Each bundle has exactly one of the transport interfaces for each of the classes of service of the data packets. In step 806, the transport interfaces are organized in bundles. Each bundle preferably has one of the transport interfaces for each of the classes of service of the data packets. It should be understood that while such a relationship between bundles, transport interfaces, and classes of service and/or drop precedences is preferable, it is not necessary. From step 806, the method continues to step 807. In step 807, a routing function is applied to select a first bundle of the bundles over which a first data packet of the data packets is to be carried. In step 808, a first class of service for the first data packet is determined based on a first differentiated service codepoint value of a first data packet. In step 809, a first transport interface of the first bundle is selected to carry the first data packet based on the first class of service. Thus, steps 807-809 may occur regardless of whether there is exactly one transport interface for each class of service.

From either of steps 805 or 809, the method continues to step 810. In step 810, the data packets are carried over transport interfaces. The transport interfaces carry subsets of the data packets wherein the classes of service of the subsets of the data packets carried by the transport interfaces are unique to each of the transport interfaces. The method ends in step 811.

Accordingly, a method and apparatus for communicating data packets according to classes of service has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. Apparatus for communicating data packets according to classes of service comprising:
   a service interface for receiving the data packets, the data packets including a differentiated service codepoint field having a plurality of differentiated service codepoint values;
   a differentiated service profile associated with the service interface;
   a plurality of transport interfaces operatively coupled to the service interface, the service interface assigning a first data packet having a first differentiated service codepoint value to a first transport interface according to the differentiated service profile, wherein the service interface assigns a second data packet having a second differentiated service codepoint value to a second transport interface according to the differentiated service profile;
   a second service interface; and
   a second differentiated service profile associated with the second service interface, the second service interface operatively coupled to the plurality of transport interfaces, the second service interface assigning a third data packet having a third differentiated service codepoint value to a third transport interface according to the second differentiated service profile.

2. The apparatus of claim 1 wherein the second service interface assigns a fourth data packet having a fourth differentiated service codepoint value to the first transport interface according to the second differentiated service profile.

3. The apparatus of claim 2 wherein the second service interface assigns a fifth data packet having the first differentiated service codepoint value to the second transport interface according to the differentiated service profile.

4. The apparatus of claim I wherein the data packets received at the service interface includes a first subset of the data packets having a first class of service and a second subset of the data packets having a second class of service.

5. The apparatus of claim 4 wherein the first transport interface transports the first subset of data packets having the first class of service.

6. The apparatus of claim 5 wherein the second transport interface transports the second subset of data packets having the second class of service.

7. The apparatus of claim 6 wherein the differentiated service profile maps the first differentiated service codepoint value to the first class of service and a first drop precedence and maps the second differentiated service codepoint value to the second class of service and a second drop precedence.

\* \* \* \* \*